United States Patent [19]
Wiedemann

[11] 4,108,302
[45] Aug. 22, 1978

[54] SUCTION CONVEYOR

[75] Inventor: Friedrich Wiedemann, St- Sulpice, Switzerland

[73] Assignee: J. Bobst & Fils, S.A., Switzerland

[21] Appl. No.: 735,055

[22] Filed: Oct. 22, 1976

Related U.S. Application Data

[63] Continuation of Ser. No. 561,949, Mar. 25, 1975, abandoned.

[30] Foreign Application Priority Data

Mar. 27, 1974 [CH] Switzerland .......................... 4368/74

[51] Int. Cl.² ............................................. B65G 17/46
[52] U.S. Cl. .................................... 198/689; 271/196; 271/276
[58] Field of Search .................. 198/689, 836; 271/94, 271/196, 197, 276

[56] References Cited

U.S. PATENT DOCUMENTS

| | | | |
|---|---|---|---|
| 2,391,170 | 12/1945 | Labombarde | 271/216 |
| 2,481,934 | 9/1949 | Langston | 198/689 |
| 3,131,929 | 5/1964 | Rehm | 198/689 |
| 3,222,730 | 12/1965 | Kalwaites | 198/689 |
| 3,366,221 | 1/1968 | Preisig | 198/689 |
| 3,388,905 | 6/1968 | Nash et al. | 271/276 |
| 3,405,935 | 10/1968 | MacNeill | 271/276 |
| 3,858,709 | 1/1975 | Banyas et al. | 198/689 |
| 3,961,697 | 6/1976 | Hartman et al. | 198/689 |

FOREIGN PATENT DOCUMENTS 1,241,239  8/1971  United Kingdom ..................... 271/197

*Primary Examiner*—John J. Love
*Assistant Examiner*—Richard K. Thomson
*Attorney, Agent, or Firm*—Hill, Gross, Simpson, Van Santen, Steadman, Chiara & Simpson

[57] ABSTRACT

A suction conveying device which has a belt conveyor and at least one vacuum chamber extending parallel to the conveyor belt characterized by an obturator engaging an upper surface of the vacuum chamber to close the opening therein when a blank is not engaged thereon. The obturator is preferably a resilient sheet of spring steel which is lifted from a position closing the openings by the movement of a blank across the opening.

3 Claims, 3 Drawing Figures

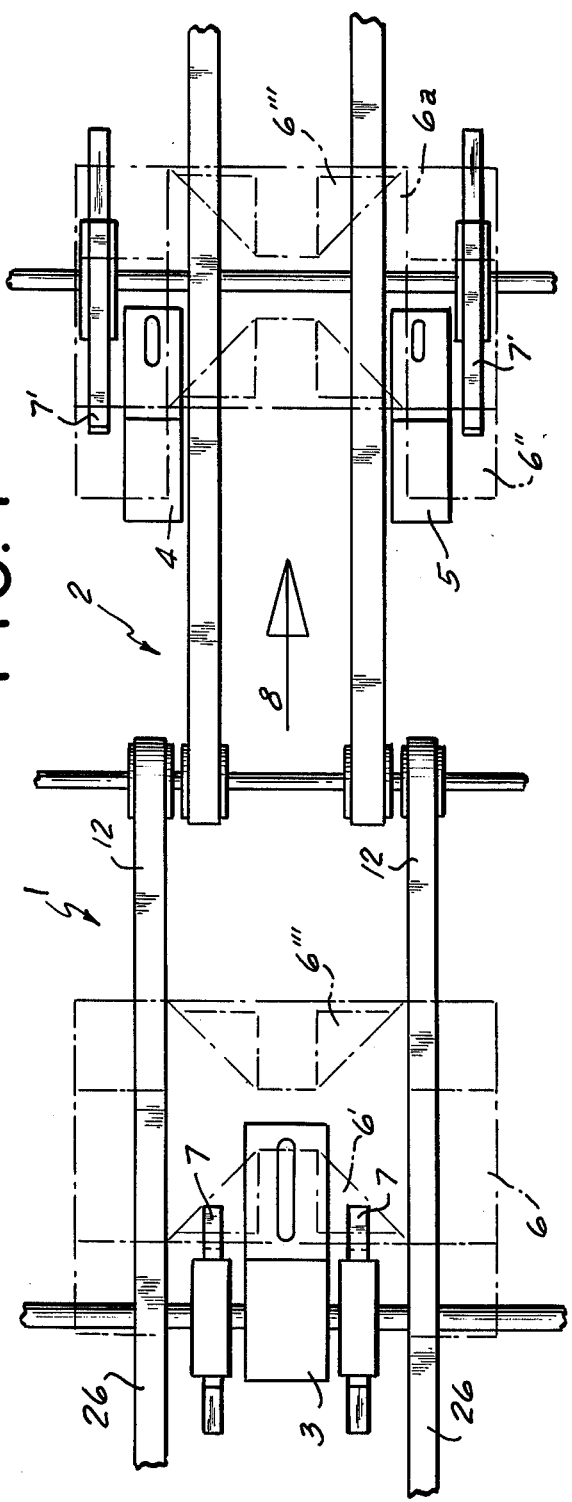

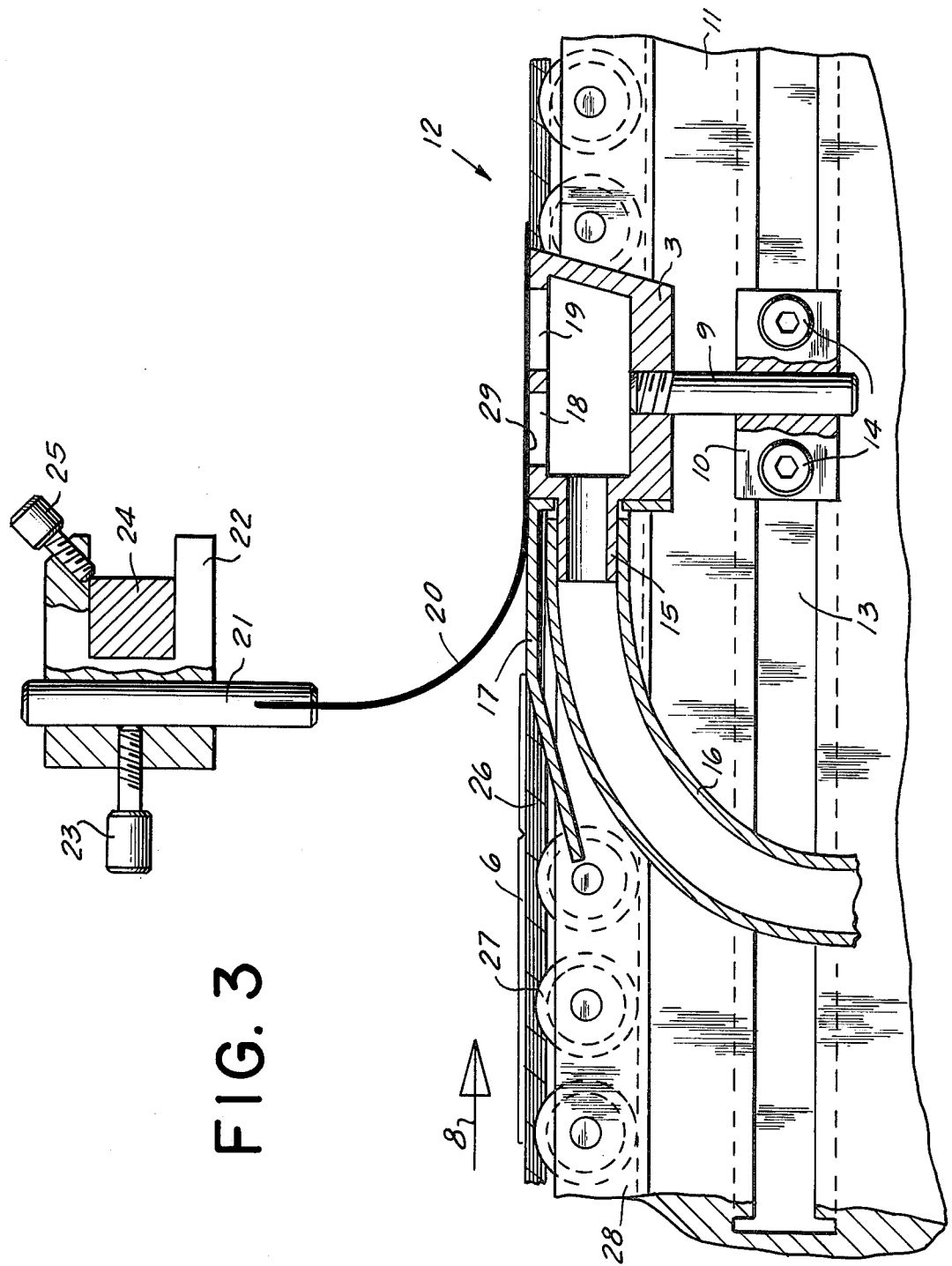

SUCTION CONVEYOR

This is a continuation of application Ser. No. 561,949, filed Mar. 25, 1975 now abandoned.

BACKGROUND OF THE INVENTION

1. Field of the Invention

The present invention is directed to a conveyor device used for instance on a blank folding machine, which conveyor device includes a belt conveyor and at least one vacuum chamber which extends parallel to the direction of movement of the belt conveyor.

2. Prior Art

Presently known conveyor devices for blank folding machines, which fold boxes or carton blanks prior to assembly, generally consist of one or more conventional belt conveyors operated jointly with at least one vacuum chamber. The vacuum chamber is positioned to extend in a direction parallel to the direction of movement of the conveying surface of the belt conveyor with its top surface lying in the plane of the conveying surface which is transporting the blank. In most cases, the vacuum chamber is adjustable to various positions relative to the belt path so that a suction can be applied either on specific areas of a blank as required during a folding operation or at specific points in the blanks path of travel on the belt conveyors. The conveyor device with the vacuum chambers has the advantages of enabling the application of a holding pressure to firmly hold a blank while various folding operations are accomplished for example turning over a flap or tab of the blank.

However, in the presently known devices, when more than one suction or vacuum chamber are utilized either in side-by-side relation or at different positions along the path of the conveyor belt, they are connected to a single or common vacuum source and problems occur with maintaining a sufficient suction on the blank during each operation. This is due to the fact that once a blank moves over or off one of the vacuum chambers to uncover its openings, the vacuum system is vented to the ambient atmosphere. The venting of one chamber reduces the amount of vacuum applied to all of the other chambers connected to the same vacuum source. The reduction of the vacuum in the other chambers results in a reduction in the suction or vacuum pressure that can be applied for holding a blank during other operations of the blank folding device.

As mentioned above, each of the vacuum chambers on a device are normally fed from a single vacuum source and, therefore, the arrangement of the vacuum chambers on a folding machine limits the machine to operate on blanks having an outline which minimizes the loss of vacuum or suction pressure due to an uncovered vacuum chamber. To solve the problem of a loss of vacuum due to uncovering of the openings of one of the vacuum chambers, it has been suggested to provide each of the vacuum chambers with an electro-magnetic valve arrangement which would operate to disconnect the chamber from the vacuum source once its openings were uncovered by the passing of a blank. However, this solution to the problem increases the expenses for manufacturing the device and thus increases the cost of the device.

SUMMARY OF THE INVENTION

The present invention is directed to an improved conveyor device which is capable of handling blanks having any size or outline and which device does not require expensive electro-magnetic valves for isolating a vacuum chamber from its source of vacuum. To accomplish these tasks, the invention comprises a conveyor device which has a belt conveyor with a conveying surface and at least one vacuum chamber communicating with a source of vacuum, each vacuum chamber having a wall with an outer surface and at least one opening extending therethrough, each vacuum chamber being disposed adjacent the belt conveyor with the outer surface lying substantially in a plane of the conveying surface for applying a holding force on a blank being transported by the conveying surface thereacross with the improvements comprising means for controlling the flow through each opening of each vacuum chamber, said means including an obturator for each opening, said obturator being displaced from the opening by movement of a blank along the upper surface across the opening so that as the moving blank passes over the opening, suction is applied thereto and as the moving blank uncovers each opening, the obturator blocks flow through the opening into the vacuum chamber. Preferably, the obturator is a sheet of resilient material such as spring steel which is preferably mounted with a portion of it engaging the upper surface of the vacuum chamber and with one end received in mounting means holding the one end at an angle to the plane surface so that the sheet is self-biasing and biases the portion into a closing position for the openings.

BRIEF DESCRIPTION OF THE DRAWINGS

FIG. 1 is a schematic plan view of a prior art blank conveyor device;

FIG. 2 is a side view of the conveyor device of FIG. 1 with portions in cross section for purposes of illustration; and FIG. 3 is a partial cross-sectional view of a vacuum chamber for a conveyor device of FIGS. 1 and 2 with the improvements according to the present invention.

DESCRIPTION OF THE PREFERRED EMBODIMENTS

The principles of the present invention are particularly useful in a prior art blank conveyor device such as schematically illustrated in FIGS. 1 and 2. The prior art conveyor device has a pair of conveyor assemblies generally indicated at 1 and 2.

The assembly 1 has a pair of belt conveyors 12, each having a continuous belt 26, and a vacuum chamber 3 which extends in a direction of movement of the conveyor belts 26. The conveyor assembly 2 includes a pair of similar belt conveyors and a pair of vacuum chambers 4 and 5 which are spaced adjacent the conveyor belts and extend parallel thereto. The vacuum or upper surfaces of the chambers 3, 4 and 5 are substantially in the plane of their respective belts (FIG. 2). All of the vacuum chambers 3, 4 and 5 are connected by appropriate tubing or hoses to a common vacuum source 30.

The coaction of the vacuum chamber 3 and the pair of belts 26 holds a blank 6 (shown in broken lines) as a composite rear flap 6' is folded or turned over by means of a pair of rotary folding hooks 7. The hook 7 engages the flap 6' as the blank 6 moves in the direction of arrow 8 along the surface of the vacuum chamber 3 to raise the flap and fold it to the position as illustrated. The movements of the rotary hook 7 and the belts 26 are synchronized so that the blank 6 will travel the desired distance between the beginning and completion of the folding operation and the vacuum chamber 3 aids in holding the blank firmly on the belts 26 as it is carried by the belts during the folding operation.

In a similar manner, the vacuum chambers 4 and 5 firmly hold the blank 6a as the rotary folding hooks 7' engage each of the single flaps 6". As illustrated in FIG. 2, the hooks 7' are just engaging the flaps 6" whereas the hooks 7 have completed the folding of the composite rear flat 6'.

It is noted that the different folding operations are sequentially performed on the blank and that the blank 6 has already had several flaps or tabs such as a complex front flap 6''' folded before the start of the folding operation for the flap 6'. Thus, due to the configuration of the blank 6 and the movement of the rotary folding arms 7 or 7', the device cannot use means for holding which means are positioned above the blank 6.

As can be seen from FIG. 1, as the blank 6 continues movement in the direction of arrow 8, the opening of the vacuum chamber 3 will be vented to atmospheric pressure which causes a reduction in the vacuum applied to all the remaining chambers such as 4 and 5 which are still required for holding and steadying the blank 6a during the folding of the tabs or flaps 6". It is also noted that as illustrated the folding of flap 6' is being completed as the folding operation on flap 6" is just beginning and thus the blank 6 will expose or uncover the opening of vacuum chamber 3 during the folding operation on the flap 6".

As best illustrated in FIG. 3, the conveyor assembly 1, has a frame which includes cross member 24 which extends above the belts 26 and a pair of side members 11 with one side member 11 for each of the belt conveyors 12. Each of the side members 11 have a guide groove 13, which has a T-shaped cross section and extends the length of the member, and each member 11 provides support for U-shaped channel member 28, which rotatably supports a plurality of rollers 27. The rollers 27 provide support for the individual continuous belt 26 of the belt conveyor 12.

The vacuum chamber 3 has a housing with an extension such as a rod 9 threaded into a bottom wall of the housing of chamber 3. The rod is adjustably fitted on a block 10 with suitable locking means (not illustrated). The block 10 is adjustably mounted on the beam 11 by a pair of T-nuts which are received in the guide groove 13 and the T-nuts are actuated by the screws 14. Thus, by loosening the screws 14, the block 10 along with the vacuum chamber 3 can be shifted along the path of movement of the belt 26 of the belt conveyor 12.

The housing of vacuum chamber 3 has an aperture such as the stub 15 which receives a hose 16 extending to the vacuum source such as 30. An upper wall of the housing is shown as having a pair of oblong openings or apertures 18 and 19 which extend through an upper surface 29 thereof. Adjacent the upper surface 29, an extension or guide 17, which has an inclined portion, is provided on the housing to facilitate movement of the blank 6 as it is transported by the belts 26 in the direction 8 so that the blank can move onto the upper surface 29 of the vacuum chamber 3. It should be noted that the upper surface 29 can be positioned to lie substantially in the plane of the belt 26 by adjusting the position of rod 9 in block 10.

The improvement of the present invention is the provision of means for closing the openings such as 18 and 19 when they are uncovered by a blank such as 6 being transported therefrom. The means for closing includes an obturator which, as illustrated, preferably comprises a sheet 20 of resilient material such as spring steel and means for mounting the obturator. The mounting means includes a rod 21, which is attached to one end of the sheet 20 and is adjustably received in a bore of block 22 by a screw 23. The block 22 is adjustably mounted on the cross frame member 24 and held thereon by a screw or setscrew 25. As illustrated, the mounting means holds the engaged end of sheet 20 at an angle to the plane of the belt 26 and, as illustrated, at an angle of approximately 90° so that the resilient nature of the sheet 20 biases the free end into a position for closing both of the apertures 18 and 19. When a blank such as 6 is transported onto the upper surface 29, it sequentially lifts the sheet 20 from a closing position of the apertures 18 and 19 as it is transported thereacross. Thus, the sheet forming the obturator is controlled by the movement of the blank across the openings such as 18 and 19. As the blank 6 is transported passed the vacuum chamber 3 to expose the opening 18, the resilient sheet 20 will again sequentially cover the openings 18 and 19 as the trailing edge of the blank uncovers these openings so that each of the openings 18 and 19 will be closed to atmospheric pressure. By mounting the one end of the sheet 20 above the plane of the belt 26 and the upper surface 29 and at an angle to this plane, the sheet 20 is curved to form a throat to facilitate receiving the leading edge of the blank as it is transferred onto the surface 29. In addition, this mounting provides an integral biasing means for urging the sheet to a closing position for each of the apertures 18 and 19 and enables the sheet 20 to yield as the flap is folded to the final position, if necessary.

While the improvement has been described only in conjunction with the vacuum chamber 3, it should be realized that the vacuum chambers 4 and 5 are also provided with the improved closing means utilizing the obturator as described with reference to vacuum chamber 3.

As can easily be realized, the conveying device utilizing the improvement of the obturator of the present invention eliminates the requirement of providing each of the vacuum chambers with electro-magnetic or electro-pneumatic devices for isolating each of the vacuum chambers from the vacuum source. The device utilizing the obturators of the present invention can be produced at a reduced cost from the previous prior art solutions to the problem of preventing venting of one vacuum chamber to the atmosphere. In addition, the device can be utilized to handle blanks of different outlines and structure without concern with whether or not the blank will cover all of the openings of the various vacuum chambers of the device and without requiring a synchronization of the blank's movement so that all the vacuum chambers are covered.

Although minor modifications may be suggested by those versed in the art, it should be understood that I wish to employ within the scope of the patent granted hereon, all such modifications as reasonably and properly come within the scope of my contribution to the art.

I claim:

1. In a conveyor device having a belt conveyor with a conveying surface and at least two separate vacuum chambers communicating with a single source of vacuum, each vacuum chamber having a wall with an outer surface and at least one opening extending therethrough, each vacuum chamber being disposed adjacent the belt conveyor with the outer surface lying substantially in the plane of the conveying surface for applying a holding force on a blank being transported by the conveying surface thereacross, the improvement comprising means for controlling the flow through each opening of each vacuum chamber, said means including a separate obturator for each vacuum chamber and means for mounting each obturator, each obturator being a sheet of resilient material having one end being engaged by the means for mounting and another end for engaging the outer surface of its respective vacuum chamber to close each of the openings therein and being displaced from the outer surface and each opening therein by movement of a blank along the outer surface across the opening, said means for mounting holding the one end of the sheet of each obturator at an angle to the plane of the outer surface of its respective vacuum chamber so that the sheet of material self-biases the other end into a position for engaging the outer surface of the respective vacuum chamber so that a moving blank passes over an opening at one of the vacuum chambers, suction is applied thereto and as the moving blank uncovers each opening of the vacuum chamber, the obturator associated therewith blocks flow through each of the uncovered openings into the vacuum chamber.

2. In a conveyor device according to claim 1, wherein each sheet of resilient material is a sheet of spring steel.

3. In a conveyor device according to claim 1, wherein the mounting means positions the one end of the resilient sheet of each obturator above a point of the conveyor path upstream of the vacuum chamber associated with the obturator so that the curvature between the engaged one end of the sheet and the other end forms a throat for receiving a blank being transported toward each vacuum chamber by the belt conveyor.

* * * * *